United States Patent [19]

Tanner et al.

[11] Patent Number: 4,705,689

[45] Date of Patent: Nov. 10, 1987

[54] USE OF AQUEOUS SODIUM OR POTASSIUM METHIONINATE SOLUTION FOR SUPPLEMENTAL MIXED FODDERS WITH METHIONINE

[75] Inventors: Herbert Tanner; Heidrun-Leonore Bertram, both of Hanau; Reinhard Richter, Rodenbach; Manfred Spindler, Hanau, all of Fed. Rep. of Germany

[73] Assignee: Degussa Aktiengesellschaft, Frankfurt am Main, Fed. Rep. of Germany

[21] Appl. No.: 806,133

[22] Filed: Dec. 9, 1985

Related U.S. Application Data

[63] Continuation of Ser. No. 346,154, Feb. 5, 1982, abandoned.

[30] Foreign Application Priority Data

Feb. 12, 1981 [DE] Fed. Rep. of Germany ....... 3105009

[51] Int. Cl.$^4$ .................................. A23K 1/22
[52] U.S. Cl. ....................... 426/2; 426/623; 426/630; 426/807
[58] Field of Search .................. 426/2, 636, 635, 623, 426/630, 281, 805, 807; 514/562; 562/559

[56] References Cited

U.S. PATENT DOCUMENTS

| | | | |
|---|---|---|---|
| 2,556,668 | 6/1951 | Greenberg . | |
| 2,879,162 | 3/1959 | Baldini et al. | 514/562 |
| 3,552,978 | 1/1971 | Inklaar | 426/281 |
| 3,668,221 | 6/1972 | Shima et al. | 562/559 |
| 3,931,307 | 1/1976 | Eikelmann et al. | 562/559 |
| 4,044,169 | 8/1977 | Bertram et al. | 426/807 X |
| 4,069,251 | 1/1978 | Mannsfeld et al. | 562/559 |
| 4,093,740 | 6/1978 | Fahnenstich et al. | 514/562 |
| 4,267,195 | 5/1981 | Boudreau et al. | 426/805 X |
| 4,272,631 | 6/1981 | Schaaf et al. | 562/559 |

OTHER PUBLICATIONS

Baker, Jour.Nutrition, vol. 110, pp. 969–964, (1080).

*Primary Examiner*—R. B. Penland
*Attorney, Agent, or Firm*—Cushman, Darby & Cushman

[57] ABSTRACT

In place of using solid DL-methionine for supplementing mixed fodders there are used sodium or potassium methioninate solutions. In comparison to solid methionine they are more easily dosable and can be more easily homogeneously mixed with the remaining components. Employing equimolar amounts they show the same methionine activity as solid methionine.

12 Claims, No Drawings

USE OF AQUEOUS SODIUM OR POTASSIUM METHIONINATE SOLUTION FOR SUPPLEMENTAL MIXED FODDERS WITH METHIONINE

This is continuation of application Ser. No. 346,154, filed Feb. 5, 1982, which was abandoned upon the filing hereof.

BACKGROUND OF THE INVENTION

The present invention is directed to the use of aqueous sodium or potassium methioninate solutions for supplementing industrially produced mixed fodders with methionine.

The essential aminoacid methionine for a long time to a considerable extent has been produced synthetically and used as a fodder additive, especially in industrially produced mixed fodders for poultry, pigs, and other agriculturally useful animals. However, problems occur in storing and processing methionine. Methionine present in crystalline form is not pourable without special measures and during the storing can stick together if this is not avoided through suitable expensive crystallization conditions. If the methionine is present in powder form, in a given case, with the addition of a flow maintaining agent, then there occurs in the handling the problem of dust formation which occurs with all powdery materials.

A further point is the exact dosaging and homogeneous distribution of solid methionine in mixed fodder. Industrially produced mixed fodder particularly serves for the nourishment of various agriculturally useful animals such as poultry, e.g. chickens, turkeys, and ducks, pigs, cattle, sheep, horses, and goats, as well as for the nourishment of domestic animals, e.g. dogs and cats. The mixed fodder in each case contains as a rule all the necessary nutrients for the respective type of animal in balanced and sufficient amount. It consists of different individual foddering agents, e.g. soybean meal, corn, other types of grains, mill by-products such as corn or corn gluten meal, meat meal, fish meal, of fodder fat, molasses, calcium acid phosphate, cattle lick, as well as other components of plant, animals, or mineral origin. Additionally, mixed fodder contains materials which are employed to improve the physiological nourishment effect of the mixed fodder. Among these are aminoacids such as methionine, as well as vitamins, minerals, trace elements, and preservatives.

The composition of the mixed fodder is subject to change depending on the supply and price of the components. However, thereby the recipe is always so structured that the nutrient content corresponds to the requirements of the animals in each case.

Industrially produced mixed fodders for broilers, laying hens, and fattening hogs, for example, can contain the compositions given in the following Table 1.

TABLE 1

Composition of Industrially Produced Mixed Fodders for Broilers, Laying Hens and Fattening Hogs (Examples)

| Feedstock | Broiler Fodder Portion in % | Laying Hen Fodder Portion in % | Fattening Hog Fodder Portion in % |
| --- | --- | --- | --- |
| Soybean meal | 33.6 | 15.2 | 3.4 |
| Corn | 30.2 | 25.0 | 73.7 |
| Wheat | 10.0 | 14.7 | — |
| Wheat bran | 1.3 | 15.0 | 12.0 |
| Corn gluten feed | — | 2.8 | — |
| Sunflower groats | — | — | 6.0 |
| Green alfalfa meal | — | 2.0 | — |
| Tapioca | 10.0 | 10.0 | — |
| Meat meal | — | — | 2.0 |
| Meat & bone meal | 3.0 | — | — |
| Meat scraps | 3.0 | — | — |
| Molasses | — | 3.0 | — |
| Animal Fat | 7.0 | 0.8 | — |
| Dicalciumphosphate/Lime phosphate | 0.46 | 0.98 | 0.56 |
| Carbonated lime fodder | 0.47 | 9.45 | 1.33 |
| Iodized Cattle salt | 0.24 | 0.36 | 0.36 |
| DL-Methionine | 0.223 | 0.157 | 0.031 |
| L-Lysine. HCl | — | — | 0.161 |
| Minerals, Trace elements, vitamins, other additives | up to 100% | up to 100% | up to 100% |

The various individual fodder agents and additives are first present as individual components. According to their condition they must be prepared, e.g. by grinding, forming meals, drying, or purification. If the individual components have the necessary condition the true mixing process is carried out in a suitable mixing apparatus. The individual mixing batches thereby are different depending on the size of the apparatus. To produce a homogeneous mixture there is required a sufficient exactness of mixing. For components which are present in only slight concentration in the final mixed fodder the production of a correspondingly more highly concentrated premixture is unavoidable. In the supplementing of mixed fodders with methionine there are used rather low concentrations in the range of 0.01 to 1.0 weight percent. For this also the production of a special premixture which contains methionine in correspondingly higher concentration is unavoidable in order to attain a homogeneous distribution in the mixed fodder.

Since the free methionine which is utilized by organisms in the same manner as methionine set free through enzymatic protein hydrolysis is only slightly soluble in water, the use of fluid aqueous formulations for supplementing industrially produced mixed fodders with methionine was previously not practicable.

SUMMARY OF THE INVENTION

However, it has now been found that aqueous solutions of sodium or potassium methioninate surprisingly exhibit the same methionine activity in their use as fodder agent additives as solid methionine insofar as they are employed in equimolar amounts.

These aqueous solutions of the sodium and potassium salts of DL-methionine in contrast to solid methionine have the advantage that they can also be dosed in small amounts. As liquid formulations they do not require in the supplementing of mixed fodders with methionine the production of an otherwise unavoidable premixture which contains methionine in correspondingly higher amounts. Rather they can be directly homogeneously mixed in the provided concentration, e.g. by spraying into a mixing chamber, with the remaining components of the mixed fodders already present in the desired concentration.

For the improvement sought in biological value of the protein in the respective mixed fodders, the addition of the aqueous solutions of sodium or potassium methioninate, depending on their concentration, is necessary in amounts of about 0.01 to about 5.0 weight percent based on the weight of the final mixed fodder.

Especially suitable are solutions whose content of sodium methioninate is between 40 and 65 weight percent or solutions whose content of potassium methioninate is between 20 and 50 weight percent. Such solutions can be attained by dissolving methionine in equivalent amounts of sodium hydroxide solution or potassium hydroxide solution. In a particularly advantageous manner, however, they are obtained directly by saponification of 5-($\beta$-methylmercaptoethyl)-hydantoin with 1.1 to 6 equivalents of sodium hydroxide and/or sodium carbonate or with 1.1 to 6 equivalents of potassium hydroxide and/or potassium carbonate. The reaction products of ammonia and carbon dioxide likewise formed in the saponification can be removed quantitatively at higher temperature. However, in the saponification there is also formed sodium carbonate or potassium carbonate, generally at least one half to one mole per mole methioninate. If the saponification of the hydantoin is carried out with potassium hydroxide and/or potassium carbonate then the aqueous solution remaining behind after driving off the ammonia and carbon dioxide in most cases can be used directly for supplementing mixed fodders. The potassium carbonate contained in it has good water solubility and is not disturbing.

On the contrary if the saponification of the hydantoin is carried out with sodium hydroxide and/or sodium carbonate then the aqueous solution containing sodium carbonate remaining behind after driving off the ammonia and carbon dioxide because of the considerably less solubility in comparison to potassium carbonate causes disturbances. It is inclined upon long storage, especially at low temperature, to partially crystallize out. Therefore it is advisable to separate off the sodium carbonate substantially as far as possible from the crude saponification mixture.

For example, this can occur by distilling off water from the crude saponification mixture until the sodium methioninate content is 40 to 65 weight percent, and after cooling separating off the precipitated sodium carbonate. Another possibility is to first cool the crude saponification mixture to about 0° C., separate off the precipitated sodium carbonate and only then distill off water until the sodium methioninate content of the solution is 40 to 65 weight percent. In both cases, the separation of the sodium carbonate can be promoted and completed by adding methanol or ethanol before its separation and in a given case stirring for some time.

Finally, practically salt impurity free aqueous solutions of sodium or potassium methioninate can also be produced by saponifying 5-($\beta$-methylmercaptoethyl)-hydantoin with a mixture of, in each case based on the hydantoin employed, 1 equivalent of sodium or potassium hydroxide and 2 equivalents of calcium oxide or hydroxide, after ending the saponification separating off the precipitated calcium carbonate and concentrating the aqueous solution of sodium or potassium methioninate remaining behind to drive off the ammonia contained until the desired content of sodium or potassium methioninate is reached.

The invention is further explained in the following examples. All percentages unless otherewise indicated are by weight.

The process can comprise, consist essentially of, or consist of the steps recited with the stated materials.

DETAILED DESCRIPTION

EXAMPLE 1

3 week old male rats were fed (a) a methionine poor ration, (b) the methionine poor ration with addition of 0.198% of a 56.0% aqueous sodium methioninate solution, (c) the methionine poor ration with addition of 0.315% of a 40% aqueous potassium methioninate solution, (d) the methionine poor ration with addition of 0.1% of solid DL-methionine.

The methionine poor ration in each case consisted of the following components:

Composition of the Ration (%):

| | |
|---|---|
| Soybean meal | 22.0 |
| Starch, DAB 6 | 53.0 |
| Sucrose | 10.0 |
| Soybean oil | 3.0 |
| Cellulose | 4.0 |
| Minerals and Trace elements mixture | 6.0 |
| Vitamin mixture | 2.0 |

The crude protein content of the ration was 10%.
The analyzed aminoacid content was (%):

| | |
|---|---|
| Methionine | 0.12 |
| Cystine | 0.19 |
| Methionine + Cystine | 0.31 |
| Lysine | 0.68 |

The 3 week old male rats (Strain SIV 50) having a weight of about 50 grams were divided into 4 groups of 8 aminals. The aminals were held individually in cages at a room temperature of 21° C. ($\pm$1° C.). The main experiment ran for 28 days. Weight and fodder uptake were determined weekly.

The results are presented in Table 2 for weight increase and fodder intake:

TABLE 2

| | | | | | |
|---|---|---|---|---|---|
| Methionine Activity of Aqueous Sodium Methioninate and Potassium Methioninate Solutions with Rats | | | | | |
| Group (each n = 8) | Ration | Weight (g) Beginning | End | Increase (g) | Fodder Consumed (g) |
| 1 | Methionine Poor Basal ration (BR) | 50.3 | 154.8 | 104.5 | 435.7 |
| 2 | BR + 0.10% Methionine (0.198% of a 56.0% | 48.3 | 210.0 | 161.7 | 496.2 |

TABLE 2-continued

Methionine Activity of Aqueous Sodium Methioninate and Potassium Methioninate Solutions with Rats

| Group (each n = 8) | Ration | Weight (g) Beginning | Weight (g) End | Increase (g) | Fodder Consumed (g) |
|---|---|---|---|---|---|
| 3 | aqueous solution of sodium methioninate) BR + 0.10% Methionine (0.315% of a 40.0% aqueous solution of Potassium methioninate) | 49.6 | 211.7 | 162.1 | 501.6 |
| 4 | BR + 0.10% Methionine (content 99.5%) | 53.9 | 216.4 | 162.5 | 508.4 |

The results prove that aqueous solutions of sodium or potassium methioninate used according to the invention have the same methionine activity as solid methionine, insofar as equimolar amounts are employed.

EXAMPLE 2

The effectiveness of an aqueous solution of sodium methioninate (51.7%) and an aqueous solution of potassium methioninate (37.3%) was tested on male and female chicks of the breed "Shaver Starbo" in a three week battery experiment.

There served as basal ration a crystalline aminoacid diet which contained all nutrients in a fixed calculated needed (composition and is particularly suited to recognize differences in the effectiveness of added substances (J. Nutr. 110, 959 (1980)).

This basal ration was composed as follows:

TABLE 3

Composition of the Basal Ration

| Basal Ration | % | Amino acid Mixture | % |
|---|---|---|---|
| Corn starch | 58.7 | L-Arginine | 0.95 |
| Corn Oil | 10.0 | L-Histidine | 0.33 |
| Cellulose | 3.7 | L-Lysine.HCl | 1.14 |
| Amino acid Mixture | 19.5 | L-Tyrosine | 0.45 |
|  |  | L-Tryptophan | 0.15 |
| Vitamin-Mineral | 1 | L-Phenylalanine | 0.50 |
| Mixture* |  | L-Threonine | 0.65 |
| NaHCO$_3$ | 1.5 | L-Leucine | 1.00 |
| CaCO$_3$ | 1 | L-Isoleucine | 0.60 |
| CaHPO$_4$.2H$_2$O | 2.8 | L-Valine | 0.69 |
| K$_2$HPO$_4$ | 0.9 | Glycine | 0.60 |
| NaCl | 0.88 | L-Proline | 0.40 |
| Total | 100 | L-Glutamic acid | 12.00 |
|  |  | Total | 19.46 |

*The Vitamin-Mineral mixture contained the following ingredients per kg fodder: 80 mg Thiamine, 100 mg Niacin, 16 mg Riboflavin, 10 mg D-Pantothenic acid, 2000 mg Choline chloride, 5 mg Pyridoxine, 4 mg Folic acid, 0.6 mg Biotin, 20 mg DL-α-Tocopherol-acetate, 100 mg Inositol, 2 mg para-Aminobenzoic acid, 5 mg Menadione, 250 mg Ascorbic acid, 0.02 mg Vitamin B$_{12}$, 10,000 I.U. Retinyl acetate, 600 I.C.U. Cholecalciferol, 125 mg Antioxidant, 3500 mg MgSO$_4$.7H$_2$O, 650 mg MnSO$_4$.H$_2$O, 500 mg Iron citrate, 150 mg ZnSO$_4$.H$_2$O, 20 mg CuSO$_4$.5H$_2$O, 9 mg Na$_2$MoO$_4$.2H$_2$O, 9 mg H$_3$BO$_3$, 40 mg KI, 1 mg CoSO$_4$.7H$_2$O, and 2 mg Na$_2$SeO$_3$. To this basal ration there was added 0.4, 0.5 and 0.6% of crystalline DL-methionine or the methionine equivalent amounts of aqueous solutions of sodium methioninate and potassium methioninate. Each test group consisted of 72 animals (6 repetitions of 12 animals each). The animals received the fodder in meal form ad libitum. Water was automatically continuously available.

Measured test criteria were body weight, feed consumption, as well as feed conversion.

At the beginning of the experiment the male animals were 5 days old and the female animals 6 days old.

The results after 21 days of the experiment are set forth in Table 4.

TABLE 4

Average Weight Increase, Feed Consumption and Feed Conversion After 21 Days of the Experiment

| Test Group | Increase (g/animal) | Feed Consumption (g/animal) | Feed Conversion (kg Fodder/kg Increase) |
|---|---|---|---|
| I 0.40% Methionine | 222 | 544 | 2.45 |
| II 0.50% Methionine | 386 | 741 | 1.92 |
| III 0.60% Methionine | 484 | 830 | 1.72 |
| IV 0.40% Methionine (0.88% 51.7% sodium methioninate solution) | 219 | 523 | 2.39 |
| V 0.50% Methionine (1.11% 51.7% Na met. solution) | 368 | 710 | 1.93 |
| VI 0.60% Methionine (1.33% 51.7% Na met. solution) | 462 | 796 | 1.74 |
| VII 0.40% Methionine (1.35% 37.3% Potassium methioninate solution) | 220 | 530 | 2.41 |
| VIII 0.50% Methionine (1.69% 37.3% K met. solution) | 376 | 729 | 1.94 |
| IX 0.60% Methionine (2.03% 37.3% K met. solution) | 472 | 821 | 1.74 |

The especial advantage of the ration used in Example 2 is that differences in the physiological nourishment effectiveness which might possibly exist between different additives can be especially clearly and significantly established. Thereby there are judged the performance parameters weight increase, feed consumption, and feed conversion as criteria with agriculturally useful animals. The results show that through the use of aqueous sodium methioninate and potassium methioninate solutions according to the invention the protein value of the fodder is improved in the same manner as through supplementing with equimolar amounts of solid methionine. In no case were significant differences established.

The aqueous sodium methioninate and potassium methioninate solutions of the invention can be employed in all mixed fodders in place of solid methionine. Thus the aqueous sodium methioninate and potassium methioninate solutions of the invention can be employed in an equimolar amount in place of the DL-methionine in the mixed fodders of Table 1 as well as in mixed fodders for any of the animals mentioned above.

The entire disclosure of German priority application P 3105009.3 is hereby incorporated by reference.

What is claimed is:

1. A process of supplying methionine to an animal consisting of feeding the animal a mixed fodder consisting of conventional feed components and about 0.01 to about 5.0 weight percent of an aqueous solution of sodium or potassium methioninate, the aqueous solution containing 40 to 65 weight percent of sodium methioninate or 20 to 50 weight percent of potassium methioninate.

2. A mixed fodder consisting of conventional fodder components and about 0.01 to about 5.0 weight percent of an aqueous solution of sodium or potassium methioninate, the aqueous solution containing 40 to 65 weight percent of sodium methioninate or 20 to 50 weight percent of potassium methioninate.

3. A mixed fodder according to claim 2 containing sodium methioninate.

4. A mixed fodder according to claim 2 containing potassium methioninate.

5. A mixed fodder according to claim 2 which is a fodder for poultry, pigs, or cattle.

6. A mixed fodder according to claim 5 whichis a fodder for poultry.

7. A mixed fodder according to claim 5 which is a fodder for cattle.

8. A mixed fodder according to claim 5 which is a fodder for pigs.

9. A mixed fodder according to claim 2 wherein the aqueous solution consists of water and sodium or potassium methioninate.

10. A mixed fodder according to claim 2 wherein the aqueous solution consists of water and the product obtained by the saponification of 5-($\beta$-methylmercaptoethyl)-hydantoin with sodium hydroxide, sodium carbonate, potassium hydroxide or potassium carbonate followed by removal of the ammonia and carbon dioxide formed and removal of the sodium carbonate or potassium carbonate present.

11. A mixed fodder according to claim 2 wherein the aqueous solution consists of water and the product obtained by the saponification of 5-($\beta$-methylmercaptoethyl)-hydantoin with sodium hydroxide or sodium carbonate followed by removal of the ammonia and carbon dioxide formed and removal of the sodium carbonate present.

12. A mixed fodder according to claim 2 wherein the aqueous solution consists of water and the product obtained by the saponification of 5-($\beta$-methylmercaptoethyl)-hydantoin with potassium hydroxide or potassium carbonate followed by removal of the ammonia and carbon dioxide formed.

* * * * *